(12) United States Patent
William (10) Patent No.: US 12,467,777 B2
(45) Date of Patent: Nov. 11, 2025

(54) SYSTEMS AND METHODS FOR TRACKING LIQUID CONSUMPTION FOR A BOTTLE ASSEMBLY

(71) Applicant: Haier US Appliance Solutions, Inc., Wilmington, DE (US)

(72) Inventor: Santhosh William, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 77 days.

(21) Appl. No.: 18/606,506

(22) Filed: Mar. 15, 2024

(65) Prior Publication Data

US 2025/0290783 A1    Sep. 18, 2025

(51) Int. Cl.
| | | |
|---|---|---|
| *G01F 3/38* | (2006.01) | |
| *A47G 19/22* | (2006.01) | |
| *B65D 23/00* | (2006.01) | |
| *B65D 25/04* | (2006.01) | |
| *G01F 15/063* | (2022.01) | |
| *G01F 15/12* | (2006.01) | |

(52) U.S. Cl.
CPC ............ *G01F 3/38* (2013.01); *A47G 19/2205* (2013.01); *B65D 23/006* (2013.01); *B65D 25/04* (2013.01); *G01F 15/063* (2013.01); *G01F 15/125* (2013.01); *B65D 2201/00* (2013.01)

(58) Field of Classification Search
CPC ........ G01F 3/38; G01F 15/063; G01F 15/125; B65D 23/006; B65D 25/04; B65D 2201/00; G06V 40/13; G06V 40/1365; G06V 40/10; B67D 1/0888; B67D 1/0007; G06F 3/04847; G06F 3/0488; G06F 18/22; G05B 15/02; F25D 23/126; F25D 2700/04; F25D 2400/361
USPC .......................................................... 141/11
See application file for complete search history.

(56) References Cited

U.S. PATENT DOCUMENTS

| | | | |
|---|---|---|---|
| 7,107,838 B2 | 9/2006 | Chai et al. | |
| 10,750,842 B2 | 8/2020 | Sengupta et al. | |
| 11,013,353 B2 | 5/2021 | Hambrock et al. | |
| 11,051,641 B2 | 7/2021 | Schucker et al. | |
| 11,112,763 B1 | 9/2021 | Collins et al. | |
| 11,891,295 B2 | 2/2024 | Caverno et al. | |
| 2002/0101346 A1* | 8/2002 | Busick ................. | B67D 3/0032 340/521 |
| 2012/0245729 A1* | 9/2012 | Wegelin ................ | G01F 15/068 700/231 |

(Continued)

FOREIGN PATENT DOCUMENTS

| | | |
|---|---|---|
| CN | 105046302 A | 11/2015 |
| CN | 113165773 A | 7/2021 |

*Primary Examiner* — Craig M Schneider
*Assistant Examiner* — Christopher M Afful
(74) *Attorney, Agent, or Firm* — Dority & Manning, P.A.

(57) ABSTRACT

A method of tracking liquid consumption for a bottle assembly may include sensing a dispensing operation of an external liquid dispenser. The method may further include determining an identity of the external liquid dispenser based on sensing the dispensing operation of the external liquid dispenser. The method may also include adjusting the flow assembly in response to determining the identity of the external liquid dispenser. The flow assembly may define a filter position and a bypass position. The method may also include measuring liquid data of the liquid reservoir following adjusting the flow assembly.

20 Claims, 6 Drawing Sheets

(56) References Cited

U.S. PATENT DOCUMENTS

| | | |
|---|---|---|
| 2022/0041425 A1* | 2/2022 | Sankaran ............. G06F 3/0482 |
| 2023/0127059 A1 | 4/2023 | Caverno et al. |

* cited by examiner

SYSTEMS AND METHODS FOR TRACKING LIQUID CONSUMPTION FOR A BOTTLE ASSEMBLY

FIELD OF THE DISCLOSURE

The present subject matter relates generally to a bottle assembly and more particularly to tracking liquid consumption for a bottle assembly.

BACKGROUND OF THE DISCLOSURE

Containers such as water bottles are used to hold liquid, mainly water, for the purpose of transporting a drink while travelling or while otherwise away from a potable water source. Potable water sources can include, but are not limited to, water dispensers found in household appliances (e.g., a water dispenser in a refrigerator appliance) or outside water sources (e.g., water fountains that can be found in public environments).

Many consumers, and in particular consumers of reusable water bottles, are becoming more health conscious. For instance, many consumers have applications through which they may track certain dietary information, such as water consumption. However, the consumer is left to manually enter the information into a separate application to accurately record the amount of water ingested. There are numerous drawbacks to manual entry of dietary information, and more particularly, water consumption, into a separate application. For example, the process of manually entering the information into a separate application can be cumbersome and time consuming for the consumer. As another example, the consumer can forget to enter the information, thus leading to an inaccurate record of the water consumption.

Accordingly, a bottle assembly that obviates one or more of the above-mentioned features would be beneficial.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, a method of tracking liquid consumption for a bottle assembly is provided. The bottle assembly may include a body and a flow assembly provided within a liquid reservoir of the body. The method may include sensing a dispensing operation of an external liquid dispenser. The method may also include determining an identity of the external liquid dispenser based on sensing the dispensing operation of the external liquid dispenser. The method may also include adjusting the flow assembly in response to determining the identity of the external liquid dispenser. The flow assembly may define a filter position and a bypass position. The method may further include measuring liquid data of the liquid reservoir following adjusting the flow assembly.

In another exemplary aspect of the present disclosure, a bottle assembly for tracking liquid consumption is provided. The bottle assembly may include a body. The body may define a liquid reservoir. The bottle assembly may also include a flow assembly provided within the liquid reservoir. The bottle may further include a controller operable for: sensing a dispensing operation of an external liquid dispenser; determining an identity of the external liquid dispenser based on sensing the dispensing operation of the external liquid dispenser; adjusting the flow assembly in response to determining the identity of the external liquid dispenser, wherein the flow assembly defines a filter position and a bypass position; and measuring liquid data of the liquid reservoir following adjusting the flow assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations.

Figure 1:
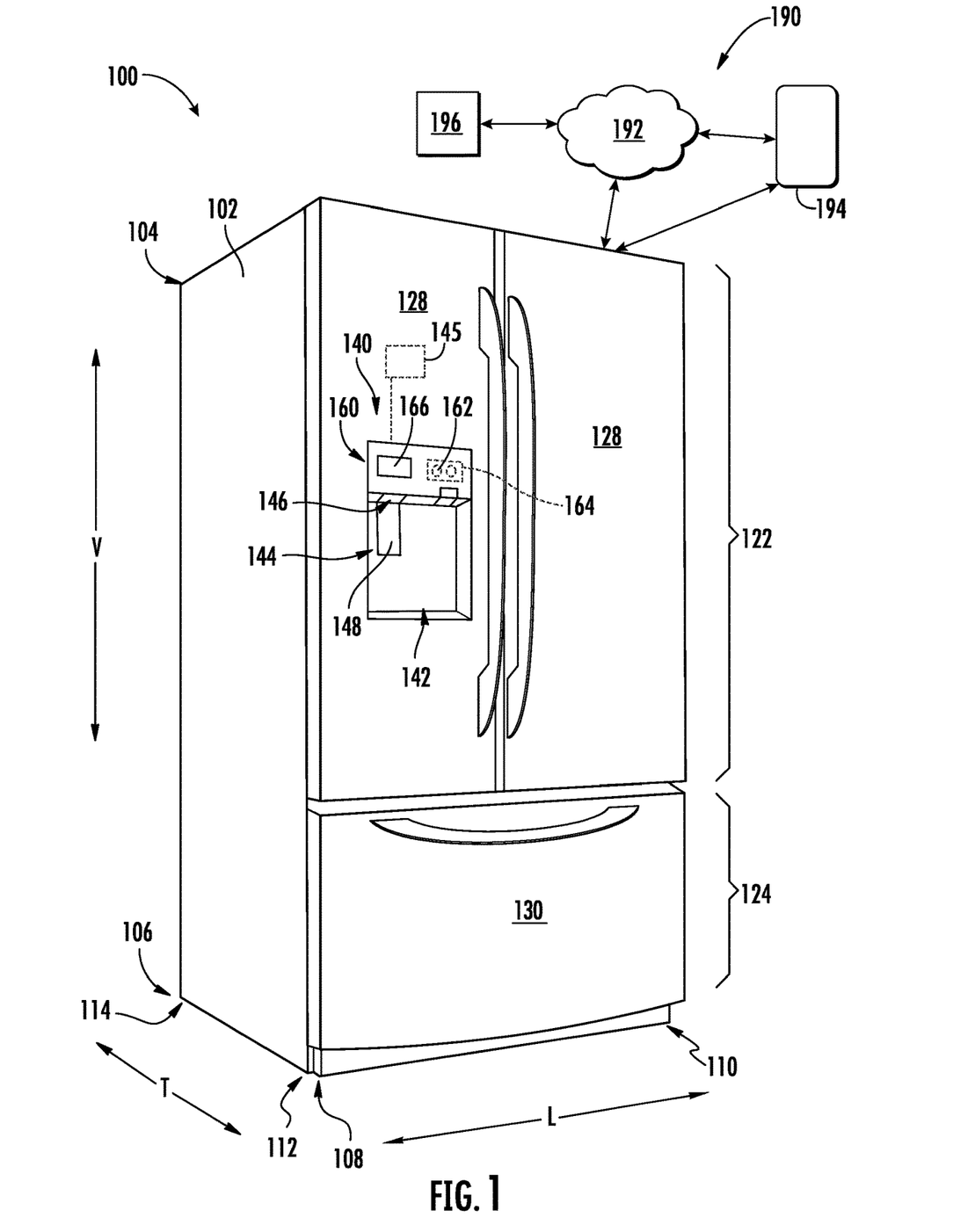
FIG. 1 provides a perspective view of a refrigerator appliance including a dispensing assembly according to one or more exemplary embodiments of the present subject matter.

According to one or more exemplary embodiments of the present subject matter a water bottle configured for automatically tracking water consumption is provided. Referring now to FIG. 1, a perspective view of a connectable refrigerator appliance 100 according to one or more exemplary embodiments of the present subject matter is provided. As should be appreciated, the benefits of the present disclosure apply to other types or styles of connectable household appliances, for example, stand-alone water dispensers or connectable external liquid sources. Consequently, the description set forth herein is for illustrative purposes only and is not intended to be limiting in any aspect to any particular refrigerator chamber configuration.

The connectable refrigerator appliance 100 includes a cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Cabinet 102 defines chilled chambers for receipt of food items for storage. In particular, cabinet 102 defines fresh food chamber 122 positioned at or adjacent top 104 of cabinet 102 and a freezer chamber 124 arranged at or adjacent bottom 106 of cabinet 102. As such, connectable refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance (e.g., when a dispenser assembly (described below) is available on the appliance). Consequently, the description set forth herein is for illustrative purposes only and is not intended to be limiting in any aspect to any particular refrigerator chamber configuration.

Refrigerator doors 128 are rotatably hinged to an edge of cabinet 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1. One skilled in the art will appreciate that other chamber and door configurations are possible and within the scope of the present invention.

A dispensing assembly 140 will now be described according to exemplary embodiments of the present subject matter. Dispensing assembly 140 is generally configured for dispensing liquid water or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of connectable refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes a dispenser 144 including a discharging outlet 146 for discharging ice or water from dispensing assembly 140. An actuating mechanism 148, shown as a paddle, is mounted below discharging outlet 146 for operating dispenser 144 (e.g., for discharging ice or water). In alternative exemplary embodiments, any suitable actuating mechanism may be used to operate dispenser 144. For example, dispenser 144 can include a sensor (such as an ultrasonic sensor) or a button rather than the paddle. Discharging outlet 146 and actuating mechanism 148 are an external part of dispenser 144 and are mounted in dispenser recess 142. In some embodiments, the dispensing assembly 140 may include a water filter 145. The water filter 145 may filter contaminants (e.g., bacteria) from water prior to the water being discharged from the discharging outlet 146. The water filter 145 may be any suitable water filter configured to filter contaminants from water. For example, the exemplary water filter 145 may be a granular activated charcoal filter, a reverse osmosis filter, ion exchange filter, etc.

Inside connectable refrigerator appliance 100, door 128 may define an icebox housing an icemaker and an ice storage bin that are configured to supply ice to dispenser recess 142. In this regard, for example, the icebox may define an ice making chamber for housing an ice making assembly, a storage mechanism, and a dispensing mechanism.

A control panel 160 is provided for controlling the mode of operation. For example, control panel 160 includes one or more selector inputs 162, such as knobs, buttons, touch-screen interfaces, etc., such as a water dispensing button and an ice-dispensing button, for selecting a desired mode of operation such as crushed or non-crushed ice. In addition, inputs 162 may be used to specify a fill volume or method of operating dispensing assembly 140. In this regard, inputs 162 may be in communication with a processing device or controller 164. Signals generated in controller 164 operate connectable refrigerator appliance 100 and dispensing assembly 140 in response to selector inputs 162. Additionally, a display 166, such as an indicator light or a screen, may be provided on control panel 160. Display 166 may be in communication with controller 164 and may display information in response to signals from controller 164.

Referring still to FIG. 1, an external communication system 190 will be described according to an exemplary embodiment of the present subject matter. In general, external communication system 190 is configured for permitting interaction, data transfer, and other communications between connectable refrigerator appliance 100 and one or more external devices. For example, this communication may be used to provide and receive operating parameters, user instructions or notifications, performance characteristics, user preferences, or any other suitable information for improved performance of connectable refrigerator appliance 100. In addition, it should be appreciated that external communication system 190 may be used to transfer data or other information to improve performance of one or more external devices or appliances or improve user interaction with such devices.

For example, external communication system 190 permits controller 164 of connectable refrigerator appliance 100 to communicate with a separate device external to connectable refrigerator appliance 100, referred to generally herein as an external device 194. As described in more detail below, these communications may be facilitated using a wired or wireless connection, such as via a network 192. In general, external device 194 may be any suitable device separate from connectable refrigerator appliance 100 that is configured to provide or receive communications, information, data, or commands from a user. In this regard, external device 194 may be, for example, a personal phone, a smartphone, a tablet, a laptop or personal computer, a wearable device, a smart home system, or another mobile or remote device. Additionally or alternatively, external device 194 may be, for example, a bottle assembly such as bottle assembly 200 described in more detail below.

In addition, a remote server 196 may be in communication with appliance 100 or external device 194 through network 192. In this regard, for example, remote server 196 may be a cloud-based server 196, and is thus located at a distant location, such as in a separate state, country, etc. According to an exemplary embodiment, external device 194 may communicate with a remote server 196 over network 192, such as the Internet, to transmit/receive data or information, provide user inputs, receive user notifications or instructions, interact with or control connectable refrigerator appliance 100, etc. In addition, external device 194 and remote server 192 may communicate with connectable refrigerator appliance 100 to communicate similar information.

In general, communication between connectable refrigerator appliance 100, external device 194, remote server 176, or other user devices (e.g., bottle assembly 200) or appliances may be carried using any type of wired or wireless connection and using any suitable type of communication network, non-limiting examples of which are provided below. For example, external device 194 may be in direct or indirect communication with connectable refrigerator appliance 100 through any suitable wired or wireless communication connections or interfaces, such as network 192. For example, network 192 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), or protection schemes (e.g., VPN, secure HTTP, SSL).

External communication system 190 is described herein according to an exemplary embodiment of the present subject matter. However, it should be appreciated that the exemplary functions and configurations of external communication system 190 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

According to one or more exemplary embodiments of the present subject matter a bottle assembly 200 is provided. The exemplary bottle assembly 200 may advantageously be configured to automatically track water consumption (e.g., for a user of the bottle assembly 200). As used herein "water consumption" may generally refer to an amount or volume of water than may flow into, or out of, the bottle assembly 200. This amount or volume of water may generally correspond to an amount of water that a user may consume (e.g., drink). Additionally or alternatively, the bottle assembly 200 may advantageously include a bottle filter positioned within the liquid reservoir, as will be described in detail below. The bottle filter may remove unwanted substances (e.g., unwanted bacteria, minerals, etc.) from liquid prior to the liquid flowing into the main reservoir.

Figure 2:
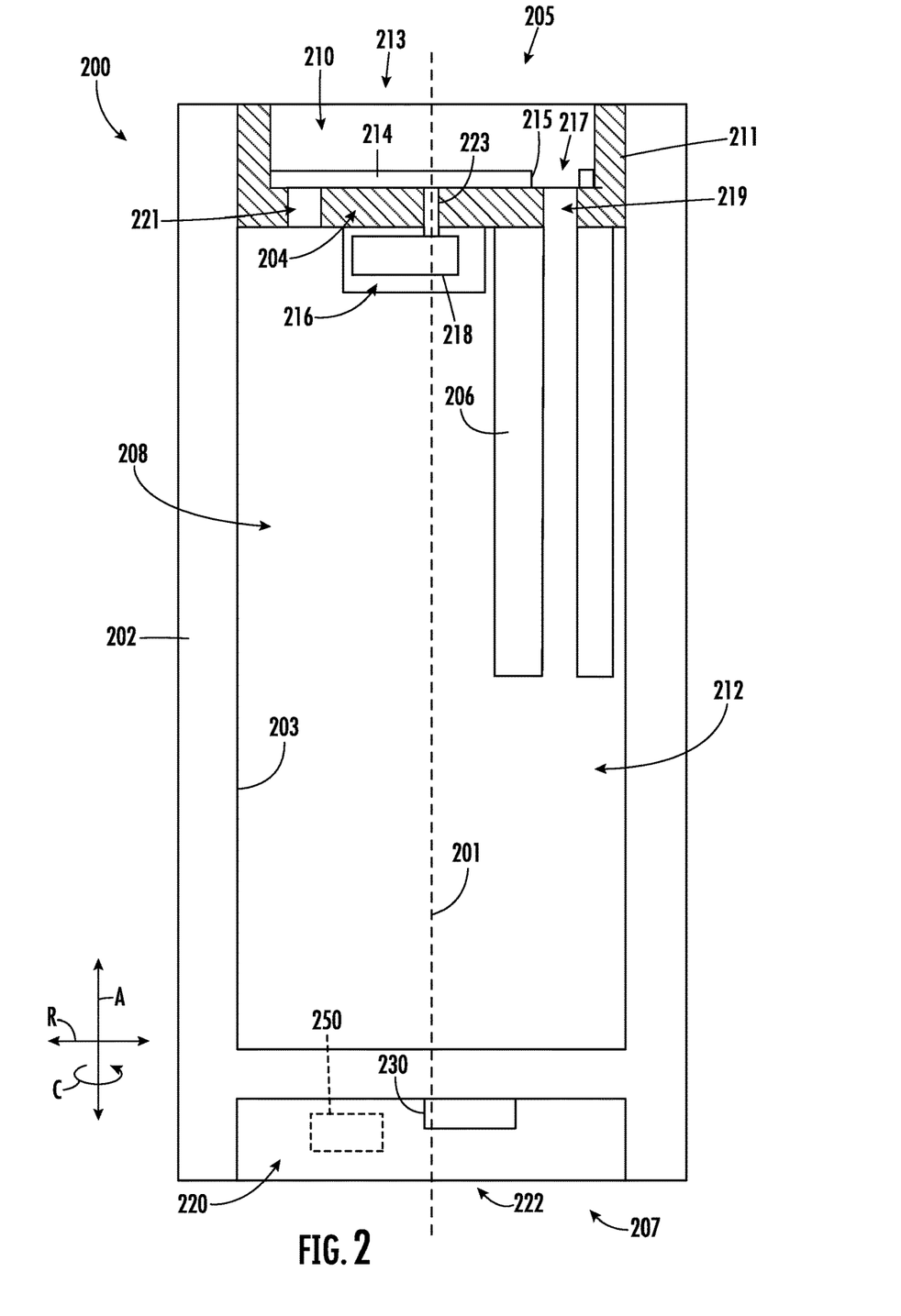
FIG. 2 provides a plan view of a bottle assembly in a filter position according to one or more exemplary embodiments of the present subject matter.
Figure 3:
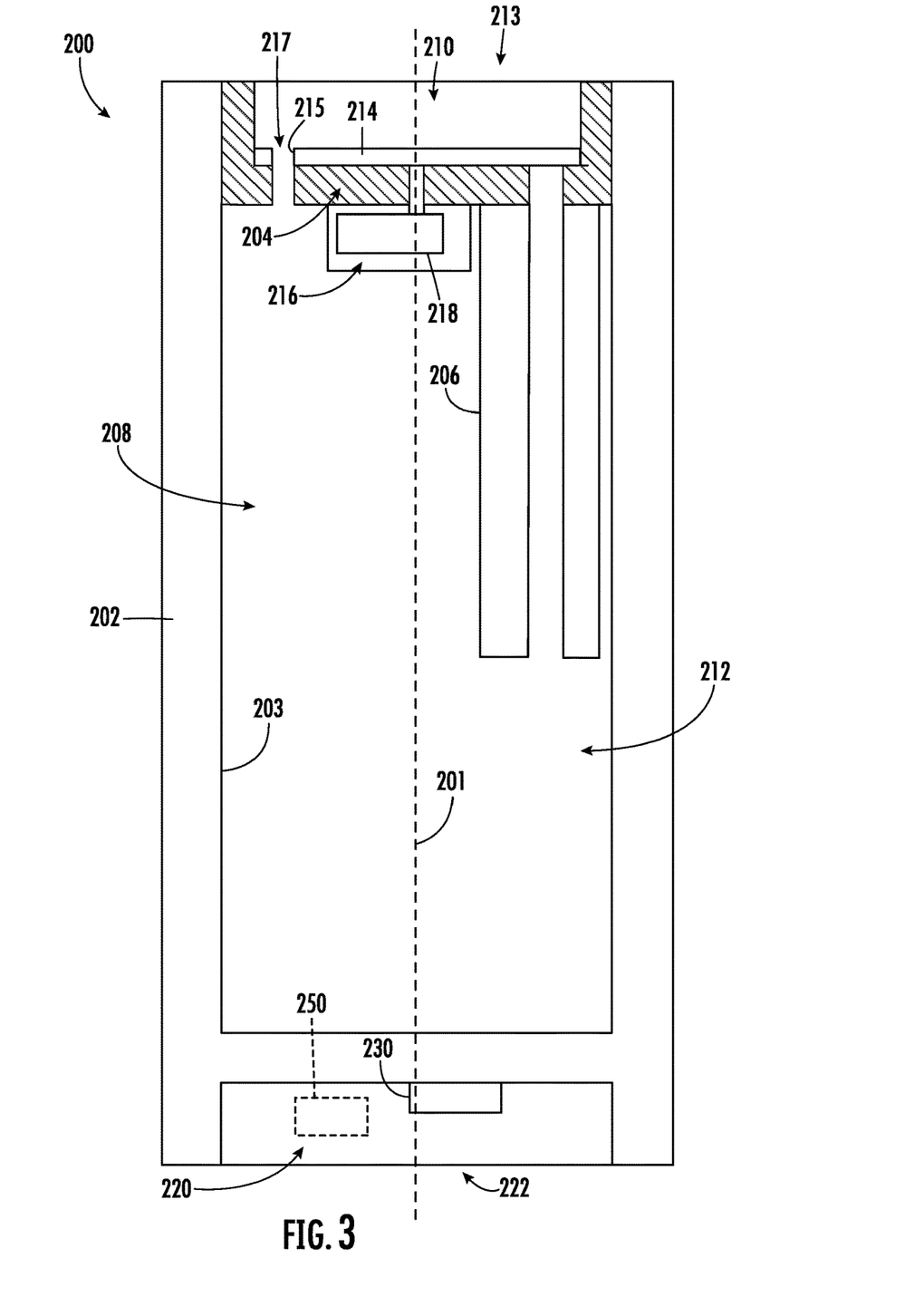
FIG. 3 provides a plan view of the bottle assembly in a bypass position according to one or more exemplary embodiments of the present subject matter.

Referring now to FIGS. 2 and 3, the bottle assembly 200 may define an axial direction A, a radial direction R, and a circumferential direction C. The bottle assembly 200 defines an axial centerline 201 that extends along the axial direction A. In general, the axial direction A extends parallel to the axial centerline 201, the radial direction R extends outward from and inward to the axial centerline 201, and the circumferential direction C extends three hundred sixty degrees (360°) around the axial centerline 201. The bottle assembly 200 extends between a top end 205 and a bottom end 207, e.g., along the axial direction A.

The bottle assembly 200 may generally include a container or a body 202, a flow assembly 204, and the bottle filter 206. The body 202 may define a liquid reservoir 208. The body 202 may hold a predetermined volume of liquid (e.g., water) within the liquid reservoir 208. The flow assembly 204 may be positioned within the body 202 to divide or separate the liquid reservoir 208 into a pre-filter reservoir 210 and a main reservoir 212. Specifically, the flow assembly 204 may include a dividing plate 214 positioned within the liquid reservoir 208. The dividing plate 214 may be inserted into the liquid reservoir 208 through an opening 213. The dividing plate 214 may rest on an insert 211 positioned proximate the top end 205 of the bottle assembly, e.g., within the liquid reservoir 208. The insert 211 may form a friction fit with a top portion of the inner wall 203. The dividing plate 214 may be coupled to or rest on the insert 211 such that the dividing plate 214 is capable of moving (e.g., rotating along the circumferential direction C or sliding along the radial direction R).

When assembly the dividing plate 214 may divide or separate the liquid reservoir 208 into a pre-filter reservoir 210 and a main reservoir 212. In some embodiments, the dividing plate 214 includes a channel 215 defining a channel flow path 217 therethrough. The channel 215 may fluidly couple the pre-filter reservoir 210 to the main reservoir 212. For instance, the dividing plate 214 may be moved (e.g., rotated) such that the channel flow path 217 is in line (e.g., in fluid communication with) a filter flow path 219 defined through the insert 211 or a bypass flow path 221 defined through the insert 211.

The pre-filter reservoir 210 may be defined above the main reservoir 212, e.g., along the axial direction A. For example, pre-filter reservoir 210 may be defined at or proximate to an opening 213 of the body 202 (e.g., while main reservoir 212 is distal to pre-filter reservoir 212). In this regard, water from an external liquid source (e.g., dispensing assembly 140) may be dispensed into the liquid reservoir 208 and initially held within the pre-filter reservoir 210. The water held within the pre-filter reservoir 210 may then flow (e.g., via gravity) through the channel flow path 217 into the main reservoir 208.

The flow assembly 204 may also include a channel assembly 216 coupled to the dividing plate 214. For instance, the channel assembly 216 may drive movement (e.g., rotation or radial movement) of the dividing plate 214. The channel assembly 216 may be configured to move the dividing plate 214, and more particularly, the channel 215, between a filter position (e.g., FIG. 2) or a bypass position (e.g., FIG. 3). In some embodiments, the channel assembly 216 may include a motor 218 coupled to the dividing plate 214. For example, a drive shaft 223 may be positioned between the motor 218 and the dividing plate 214 to transfer motion from the motor 218 to the dividing plate 214. The motor 218 may be any suitable motor 218 capable of driving rotation of the dividing plate 214. For example, the motor 218 may include or be provided as a DC motor, a stepper motor, a brushless motor, a linear motor, a servo motor or any other suitable motor capable of rotating or adjusting the dividing disk between the filter position or the bypass position.

The bottle assembly 200 may receive and hold water from one or more external liquid sources. As used herein "external liquid sources" may generally refer to liquid sources that potable water may be dispensed through. External liquid sources may include connectable liquid sources or non-connectable liquid sources. For example, connectable liquid sources may refer to liquid sources that the bottle assembly 200 may wirelessly connect to, such as the dispensing assembly 140 of the connectable refrigerator appliance 100. In some instance, the bottle assembly 200 may wirelessly connect to the external liquid source to detect or determine if the external liquid source includes an operational water filter (e.g., a non-expired water filter). As will be appreciated in more detail below, if an operational water filter is detected within the external liquid source, a flow assembly of the bottle assembly 200 may advantageously bypass the bottle filter 206 positioned within the main reservoir 212. In this regard, water flowing into the main reservoir 212 may not unnecessarily be double filtered. If the connectable external liquid includes a non-operational water filter (e.g., an expired water filter), the bottle assembly 200 may advantageously filter the water (e.g., via the bottle filter) flowing into the bottle assembly.

The filter position may be a position wherein the channel 215 of the dividing plate 214 fluidly couples the pre-filter reservoir 210 and the bottle filter 206 positioned within the main reservoir 212. In the filter position, liquid (e.g., water) that flows into the liquid reservoir 208 of the body 202 may be filtered by the bottle filter 206 (e.g., to remove any unwanted containments within the liquid). In some embodiments, the filter position of the dividing plate 214 may be the default position of the dividing plate 214. In this regard, the bottle assembly 200 may default to filtering water (e.g., via the bottle filter 206) flowing into the main reservoir 212 from the pre-filter reservoir 210.

The bypass position of the dividing plate 214 may be a position wherein the channel 215 of the dividing plate 214 fluidly couples the pre-filter reservoir 210 and main reservoir 212. Specifically, when the dividing plate 214 is in the bypass position, liquid flowing into main reservoir 212 (e.g., from the pre-filter reservoir 210) may "bypass" the bottle filter 206. As will be appreciated in more detail below, the channel assembly 216 may be configured to move (e.g., rotate) the dividing plate 214 to the bypass position when the bottle assembly 200 establishes a connection with a connectable household appliance including an operational water filter. In instances in which the connectable liquid source includes an operational filter, the bypass position of the dividing plate 214 may allow the liquid to bypass the bottle filter 206. This may notably increase the life of the bottle filter 206 as unnecessary use of the bottle filter 206 may be avoided.

Additionally, the bottle assembly 200 may include an electronics compartment 220 that may house a control assembly 222. In some embodiments, the electronics compartment 220 is positioned at a bottom of the body 202. As illustrated in FIGS. 2 and 3, the electronics compartment 220 is positioned below the liquid reservoir 208. In some embodiments, the control assembly 222 may include or be in operative communication with a processing device or a controller 250 that may be generally configured to facilitate bottle assembly 200 operation. For example, signals generated by controller 250 may operate bottle assembly 200, including any or all system components, subsystems, or interconnected devices, in response to the signals received from the sensor assembly and other control commands.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 250 may be constructed without using a microprocessor, e.g., using a combination of discrete analog or digital logic circuitry (such as switches, amplifiers, integrators, comparators, flip-flops, AND/OR gates, and the like) to perform control functionality instead of relying upon software.

Controller 250 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information or data accessible by the one or more processors, including instructions that can be executed by the one or more processors. It should be appreciated that the instructions can be software written in any suitable programming language or can be implemented in hardware. Additionally, or alternatively, the instructions can be executed logically or virtually using separate threads on one or more processors.

For example, controller 250 may be operable to execute programming instructions or micro-control code associated with an operating the bottle assembly 200, and more particularly the flow assembly 204. In this regard, the instructions may be software or any set of instructions that when executed by the processing device, cause the processing device to perform operations, such as running one or more software applications, displaying a user interface, receiving user input, processing user input, etc. Moreover, it should be noted that controller 250 as disclosed herein is capable of and may be operable to perform any methods, method steps, or portions of methods as disclosed herein. For example, in some embodiments, methods disclosed herein may be embodied in programming instructions stored in the memory and executed by controller 250.

The memory devices may also store data that can be retrieved, manipulated, created, or stored by the one or more processors or portions of controller 250. The data can include, for instance, data to facilitate performance of methods described herein. The data can be stored locally (e.g., on controller 250) in one or more databases or may be split up so that the data is stored in multiple locations. In addition, or alternatively, the one or more database(s) can be connected to controller 250 through any suitable network(s), such as through a high bandwidth local area network (LAN) or wide area network (WAN). In this regard, for example, controller 250 may further include a communication module or interface that may be used to communicate with one or more other component(s) of bottle assembly 200, controller 250, an external appliance controller (e.g., controller 164), or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

In some embodiments, the control assembly 222 includes a wireless connection module. The wireless connection module may facilitate a remote connection with, for example, a connectable household appliance (e.g., connectable refrigerator appliance 100 described in more detail above) or a remote device (e.g., external device 194 described in more detail below). In some embodiments, the wireless connection module is a near field communication module (e.g., separate from a network connection module, described below). Additionally or alternatively, wireless connection module may allow bottle assembly 200 to establish connections with one or more remote devices. For instance, wireless connection module may establish connections with multiple remote devices. The remote devices may include mobile phone devices, smart watch devices, other wearable smart devices, mobile tablets, laptop computers, or the like. The remote connections will be explained in more detail below with respect to an external communication system.

Additionally or alternatively, the control assembly 222 may include a sensor assembly 230. The sensor assembly 230 may be capable of detecting and measuring an amount of liquid that has flowed into or out of the liquid reservoir 208 of the body 202. In some embodiments, the sensor assembly 230 includes a weight sensor. The weight sensor may be capable of detecting and measuring changes in the weight of the liquid in the liquid reservoir 208. For example, the weight sensor may be a force sensor, a strain gauge, a load cell, or any other suitable type of sensor for detecting the weight of liquid in the liquid reservoir 208. The weight sensor may be positioned directly below the main reservoir 212 to detect and measure changes in weight of the main reservoir 212. The weight of the liquid reservoir 208 may correspond to a volume of liquid (e.g., water) within the liquid reservoir 208.

As should be appreciated, in alternative exemplary embodiments, the sensor assembly 230 may include any suitable sensor capable of detecting or measuring a weight or an amount (e.g., volume) of liquid that has flowed into the body 202. The amount of liquid may correspond to a weight. For example, in alternative exemplary embodiments, in the sensor assembly may include an ultrasonic sensor, a pressure sensor, or a flow sensor (e.g., in operative communication with the bottle filter 206).

Figure 4:
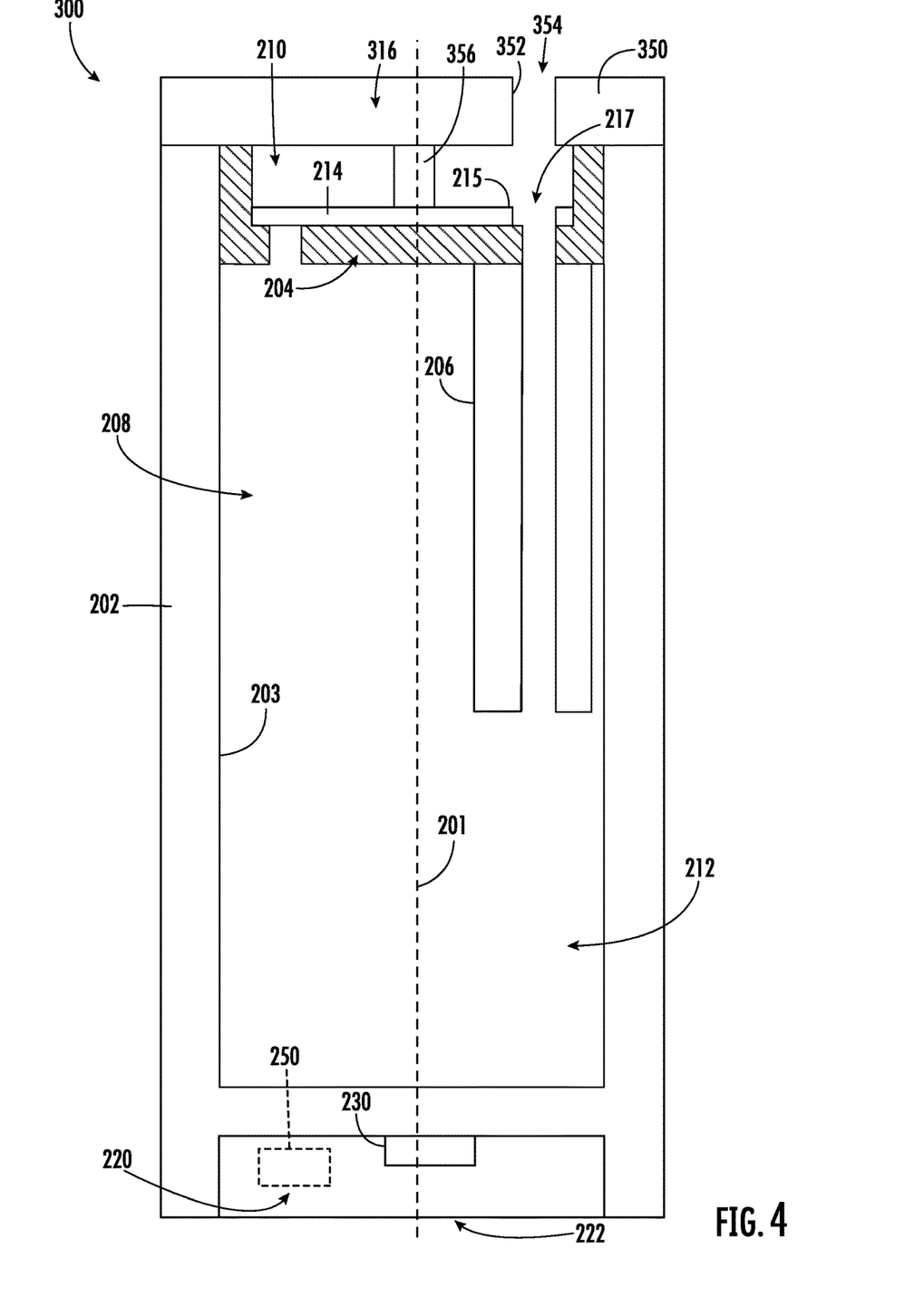
FIG. 4 provides a flow chart illustrating a method of tracking liquid consumption for a bottle assembly according to one or more exemplary embodiments of the present subject matter.

Referring now to FIG. 4, a schematic view of a bottle assembly 300 in accordance with another exemplary aspect of the present disclosure is provided. The exemplary bottle assembly 300 of FIG. 4 may be configured in substantially the same manner as the exemplary bottle assembly 200 of FIGS. 2 and 3, and accordingly, the same or similar numbers may refer to the same or similar parts.

For example, the bottle assembly 300 may define an axial direction A, a radial direction R, and a circumferential direction C. The bottle assembly 200 defines an axial centerline 201 that extends along the axial direction A. In general, the axial direction A extends parallel to the axial centerline 201, the radial direction R extends outward from and inward to the axial centerline 201, and the circumferential direction C extends three hundred sixty degrees (360°) around the axial centerline 201. The bottle assembly 200 extends between a top end 205 and a bottom end 207, e.g., along the axial direction A.

For example, the exemplary bottle assembly 300 of FIG. 4 generally includes a container or a body 202, a flow assembly 204, and a bottle filter 206. The body 202 may define a liquid reservoir 208. The body 202 may hold a predetermined volume of liquid (e.g., water) within the liquid reservoir 208. The flow assembly 204 may be positioned within the body 202 to divide or separate the liquid reservoir 208 into a pre-filter reservoir 210 and a main reservoir 212. Specifically, the flow assembly 204 may include a dividing plate 214 positioned within the liquid reservoir 208 divide or separate the liquid reservoir 208 into a pre-filter reservoir 210 and a main reservoir 212. The dividing plate 214 may be inserted into the liquid reservoir 208 through an opening 213. The dividing plate 214 may rest on an insert 211 positioned proximate the top end 205 of the bottle assembly, e.g., within the liquid reservoir 208. The insert 211 may form a friction fit with a top portion of the inner wall 203. The dividing plate 214 may be coupled to or rest on the insert 211 such that the dividing plate 214 is capable of moving (e.g., rotating along the circumferential direction C or sliding along the radial direction R).

In addition, the dividing plate 214 may include a channel 215 defining a channel flow path 217 therethrough. The channel 215 may fluidly couple the pre-filter reservoir 210 to the main reservoir 212. For instance, the dividing plate 214 may be moved (e.g., rotated) such that the channel flow path 217 is in line (e.g., in fluid communication with) a filter flow path 219 defined through the insert 211 or a bypass flow path 221 defined through the insert 211. The pre-filter reservoir 210 may be defined above the main reservoir 212. For example, pre-filter reservoir 210 may be defined at or proximate to an opening 213 of the body 202. In this regard, water from an external liquid source (e.g., dispensing assembly 140) may be dispensed into the liquid reservoir 208 and initially held within the pre-filter reservoir 210. The water held within the pre-filter reservoir 210 may then flow (e.g., via gravity) through the channel flow path 217 into the main reservoir 208.

In contrast to the above-described embodiments, the embodiment of FIG. 4 includes a channel assembly 316 including a rotating cap 350 disposed at a top end of the body 202 of the bottle assembly 200. Generally, the rotating cap 350 may permit closing or sealing the liquid reservoir 208 of the body 202. The rotating cap 350 may include a spout 352 defining an opening 354 therethrough. In addition, a drive shaft 356 may be extended from a bottom of the rotating cap 350. The drive shaft 356 may be coupled to the dividing plate 214. The rotating cap 350 may be manually rotated (e.g., by a user of the bottle assembly 200) to move the dividing plate 214 between a filter position and a bypass position (e.g., described in more detail above).

Figure 5:
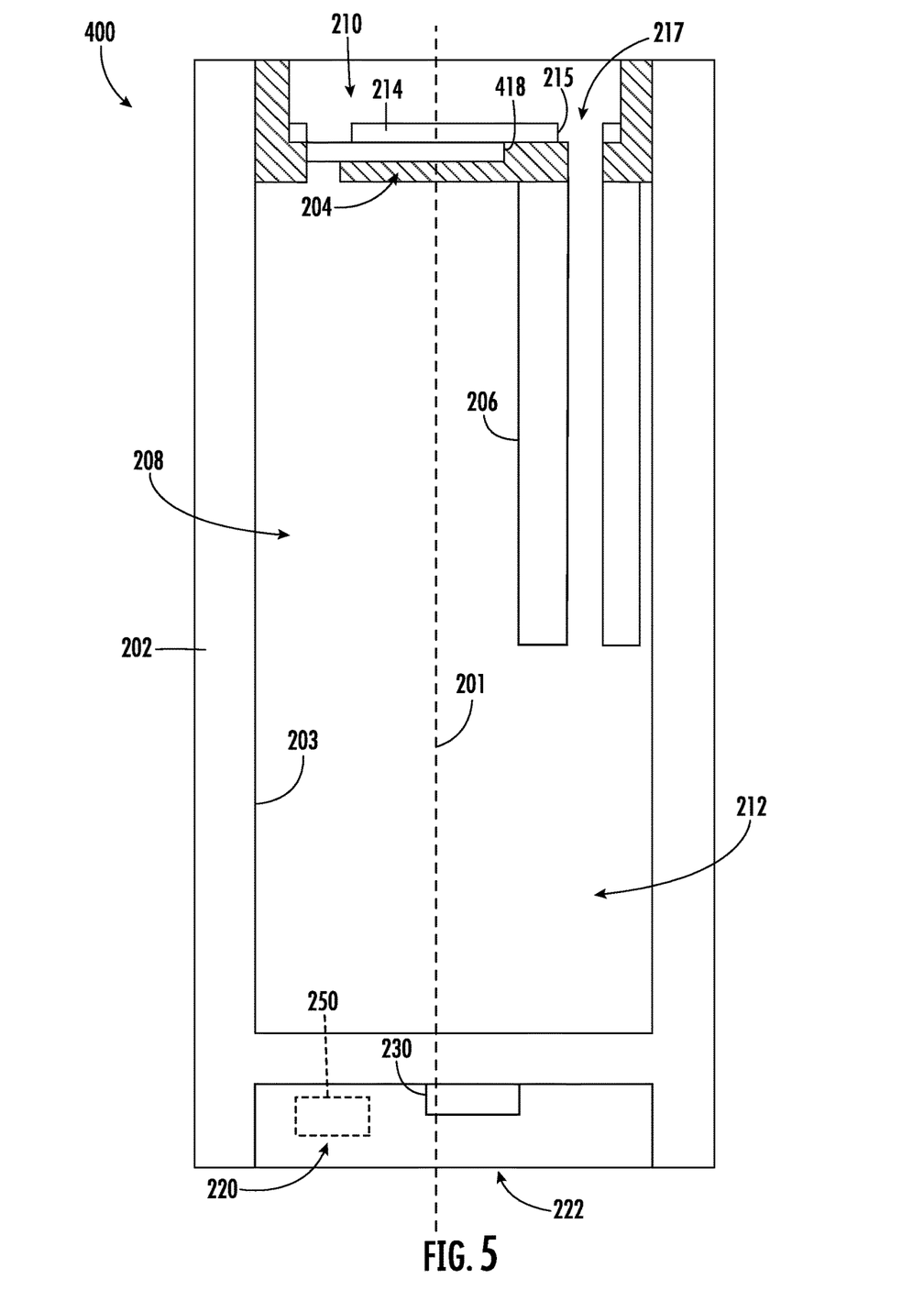
FIG. 5 provides a plan view of another bottle assembly according to one or more exemplary embodiments of the present subject matter.

Referring now to FIG. 5, a schematic view of a bottle assembly 400 in accordance with yet another exemplary aspect of the present disclosure is provided. The exemplary bottle assembly 400 of FIG. 5 may be configured in substantially the same manner as the exemplary bottle assembly 200 of FIGS. 2 and 3 or the exemplary bottle assembly 300 of FIG. 4, and accordingly, the same or similar numbers may refer to the same or similar parts.

For example the exemplary bottle assembly 400 of FIG. 5, generally include a container or a body 202, a flow assembly 204, and the bottle filter 206. The body 202 may define a liquid reservoir 208. The body 202 may hold a predetermined volume of liquid (e.g., water) within the liquid reservoir 208. The flow assembly 204 may be positioned within the body 202 to divide or separate the liquid reservoir 208 into a pre-filter reservoir 210 and a main reservoir 212. Specifically, the flow assembly 204 may include a dividing plate 214 positioned within the liquid reservoir 208 divide or separate the liquid reservoir 208 into a pre-filter reservoir 210 and a main reservoir 212. In addition, the dividing plate 214 may include a channel 215 defining a channel flow path 217 therethrough. The channel 215 may fluidly couple the pre-filter reservoir 210 to the main reservoir 212. The pre-filter reservoir 210 may be defined above the main reservoir 212. For example, pre-filter reservoir 210 may be defined at or proximate to an opening 213 of the body 202. In this regard, water from an external liquid source (e.g., dispensing assembly 140) may be dispensed into the liquid reservoir 208 and initially held within the pre-filter reservoir 210. The water held within the pre-filter reservoir 210 may then flow (e.g., via gravity) through the channel into the main reservoir 208.

However, for the embodiment of FIG. 5, a channel assembly 416 includes a linear slide 418 attached to the dividing plate 214. The linear slide 418 may be in operative communication with the controller 250, for instance, to actuate actuatable the linear slide horizontally. In this regard, the linear slide may selectively open a flow path defined through the dividing plate 214. For example, as depicted in FIG. 5, the linear slide may be actuated such that the channel flow path 217 is opened (e.g., the dividing plate is in the filter position).

Figure 6:
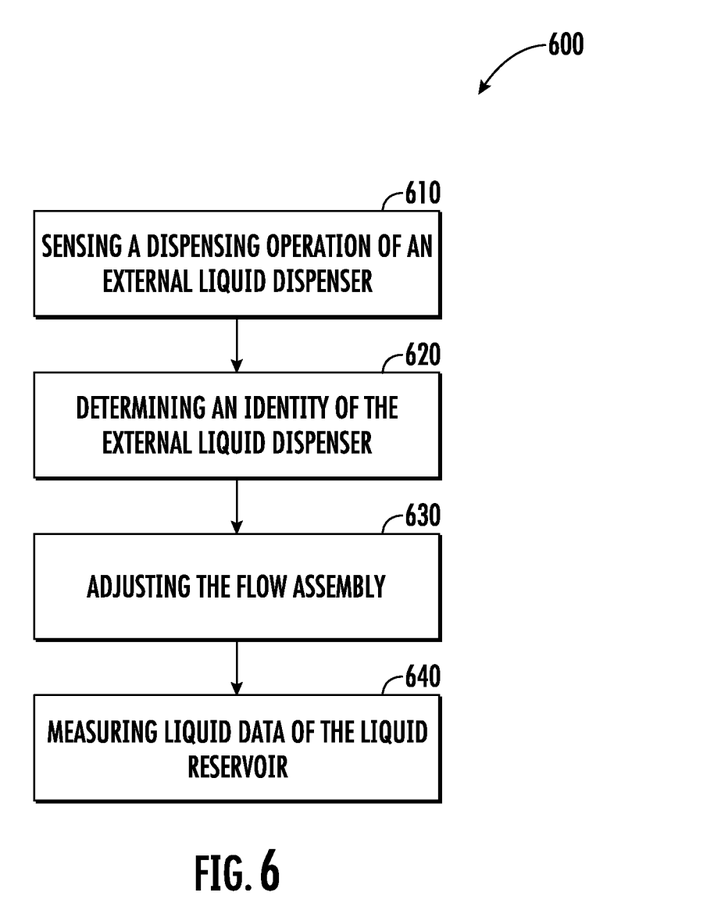
FIG. 6 provides a plan view of yet another bottle assembly according to one or more exemplary embodiments of the present subject matter.

Referring now to FIG. 6, an exemplary method of tracking liquid consumption for a bottle assembly (e.g., bottle assembly 200, bottle assembly 300, or bottle assembly 400) will be described in detail. Although the discussion below refers to the exemplary method of tracking liquid consumption for the bottle assembly, one skilled in the art will appreciate that the exemplary method is applicable to the operation of a liquid containers. In exemplary embodiments, the various method steps as disclosed herein may be performed by controller 250 or a separate, dedicated controller. Further, the steps described herein may be performed in any suitable order, and the order presented herein is not limited. Moreover, additional steps may be included, and some presented steps may be omitted, as certain applications dictate.

In detail, users of the bottle assembly may regularly obtain water from an external liquid dispenser. Users may wish to track their consumption of water for health benefits, personal goals, or the like. Accordingly, a user may maintain a profile to record and track their water consumption. In order to accurately track and maintain consumption, the bottle assembly may automatically detect and measure a volume of liquid entering or exiting the bottle assembly. Thus, method 600 outlines a process to ensure that liquid consumption is properly recorded and attributed.

The method, at 610, includes sensing, with a sensor assembly of the bottle assembly, a dispensing operation of an external liquid dispenser. Specifically, at 610, the sensor may determine or detect when liquid (e.g., water) has begun or will begin to flow liquid into the pre-filter reservoir of the bottle assembly. In some embodiments, sensing the dispensing operation of the external liquid dispenser includes detecting, via the sensor assembly, an initial volume of liquid within the liquid reservoir. For example, a weight sensor of the bottle assembly may detect a change in the weight of the bottle (e.g., caused by liquid entering the liquid reservoir, and more particularly, the pre-filter reservoir), as would be understood.

In some embodiments, the method 600, at 620, includes determining an identity of the external liquid dispenser in response to sensing the dispensing operation of the external liquid dispenser. It should be noted that determining that 620 may occur simultaneously or before 610, as specific embodiments entail. The identity of the external liquid dispenser may correspond to characteristics of the external liquid source such as the type of the external liquid dispenser. For example, the type of the external liquid dispenser may be a connectable liquid source, or a non-connectable liquid source described in more detail above.

In some embodiments, determining the identity of the external liquid dispenser includes searching, via the near field communication module, for a connectable liquid source (e.g., dispensing assembly of a connectable refrigerator appliance 100) in response to sensing the initial volume of liquid has entered the liquid reservoir. In some embodiments, searching for the connectable liquid source may include sending or receiving one or more connection requests to or from the connectable liquid source. For instance, a controller of the bottle assembly (e.g., controller 250) may send or receive connection requests to nearby connectable liquid sources via the near field communication module in an attempt to establish a connection with a nearby connectable liquid source. In this regard, information may be transmitted between the near field communication module and the connectable liquid source.

In some embodiments, attempts to connect with a nearby connectable liquid source may be unsuccessful. Thus, it may be assumed, that the external liquid source delivering water to the bottle assembly is a non-connectable liquid source. For instance, at 620, determining the identity of the external liquid dispenser may include failing to establish a connection with the connectable liquid source in response to searching for the connectable liquid source. For example, after a predetermined amount of time has elapsed or after a predetermined amount of connection requests have been sent or received, the method 600, at 620, may include determining the external liquid dispenser is a non-connectable liquid source (e.g., a public external liquid source such as a water fountain) in response to failing to establish the connection with the connectable household appliance. The method, at 620, may further include setting the flow assembly, and more particularly, a dividing plate of the flow assembly, to a filter position in response to determining the external liquid dispenser is the non-connectable liquid source. If the filter position is the default or current flow position, setting the flow assembly to the filter assembly may include maintaining a position of the dividing plate in the filter position.

In yet some other embodiments, at 620, determining the identity of the external liquid dispenser includes establishing a connection between the bottle assembly and the connectable liquid source. For instance, in such embodiments, the near field communication module may successfully establish a connection with the connectable liquid source following the search for the connectable liquid source. In such embodiments, the method 600, at 620, may further include determining a filter expiration time for a water filter (e.g., water filter 150) of the connectable liquid source. Specifically, determining the filter expiration time for the filter may include determining if the filter of the connectable liquid source is expired (e.g., if filter has exceeded a predetermined amount of liquid that may pass through the filter).

Following determining the identity of the external liquid source, the method 600, at 630, may include adjusting the flow assembly. Based on the determined identity of the external liquid dispenser, the method, at 630, may adjust the dividing plate of the flow assembly (e.g., between the default position or the bypass position). For example, if the identity of the external liquid source is determined to be a connectable liquid source and the water filter of the connectable liquid source has yet to expire, the method 600, at 630 may include adjusting the flow assembly to the bypass position. As another example, if the identity of the external liquid source is determined to be a connectable liquid source and the water filter of the connectable liquid source has expired, the method 600, at 630, may include maintaining the flow assembly in the filter position. As another example, if the identity of the external liquid source is determined to be a non-connectable liquid source, the method 600, at 630, may include maintaining the flow assembly in the filter position.

The method 600 at step 640 includes measuring liquid data of the liquid reservoir following adjusting the flow assembly. In some embodiments, measuring liquid data of the liquid reservoir includes determining, via the sensor assembly, a volume of liquid within the liquid reservoir. For example, as water flows into the main reservoir (e.g., via the bottle filter or a bypass flow path) the sensor assembly may record any changes to the main reservoir. For example, a weight sensor of the sensor assembly may continuously record any changes to the weight of the main reservoir. As the sensor assembly measures and records liquid data, the controller of the bottle assembly may communicate with one or more external devices (e.g., smartphones, tablets, smartwatches, etc.) via a network to store the liquid data information. For instance, the controller may transmit liquid data to one or more external devices registered to the bottle assembly. In this regard, a user of the bottle assembly may view their water consumption that has automatically been updated as water flows into or out of the bottle assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of tracking liquid consumption for a bottle assembly, the bottle assembly comprising a body and a flow assembly provided within a liquid reservoir of the body, the method comprising:
   sensing a dispensing operation of an external liquid dispenser;
   determining an identity of the external liquid dispenser based on sensing the dispensing operation of the external liquid dispenser;
   adjusting the flow assembly in response to determining the identity of the external liquid dispenser, wherein the flow assembly defines a filter position and a bypass position; and
   measuring liquid data of the liquid reservoir following adjusting the flow assembly.

2. The method of claim 1, wherein the bottle assembly further comprises a sensor assembly disposed at a bottom end of the body, wherein sensing the dispensing operation of the external liquid dispenser comprises:
   detecting, via the sensor assembly, an initial volume of liquid has entered the liquid reservoir.

3. The method of claim 2, wherein measuring liquid data of the liquid reservoir comprises:
   determining, via the sensor assembly, a volume of liquid dispensed into the liquid reservoir by the external liquid dispenser; and
   transmitting a signal indicative of the volume of liquid dispensed to an external device registered to the bottle assembly.

4. The method of claim 2, wherein the sensor assembly comprises a weight sensor, and wherein measuring liquid data of the liquid reservoir comprises measuring a weight of liquid within the liquid reservoir.

5. The method of claim 2, wherein the bottle assembly further comprises a near field communication module provided therein, wherein determining the identity of the external liquid dispenser comprises:
   searching, via the near field communication module, for a connectable liquid source in response to detecting the initial volume of liquid has entered the liquid reservoir.

6. The method of claim 5, wherein the bottle assembly further comprises a bottle filter, wherein the flow assembly comprises a dividing plate that separates the liquid reservoir into a pre-filter reservoir and a main reservoir, wherein the dividing plate includes a channel defining a flow path therethrough, wherein the bottle filter is positioned within the main reservoir to filter water entering the main reservoir.

7. The method of claim 6, wherein determining the identity of the external liquid dispenser comprises:

failing to establish a connection with the connectable liquid source;
determining the external liquid dispenser is a non-connectable liquid source following failing to establish the connection with the connectable liquid source; and
setting the flow assembly to the filter position in response to determining the external liquid dispenser is the non-connectable liquid source, wherein pre-filter reservoir is fluidly coupled to the bottle filter via the channel in the filter position.

8. The method of claim 6, wherein determining the identity of the external liquid dispenser comprises:
establishing a connection between the bottle assembly and the connectable liquid source via the near field communication module; and
determining a filter expiration time for a filter of the connectable liquid source.

9. The method of claim 8, wherein adjusting the flow assembly comprises:
determining the filter expiration time for the filter of the connectable liquid source is expired; and
rotating the dividing plate to the bypass position in response to determining the filter expiration time for the filter of the external liquid dispenser is expired, wherein the pre-filter reservoir is directly fluidly coupled to the main reservoir via the channel in the bypass position.

10. The method of claim 8, wherein adjusting the flow assembly comprises:
determining the filter expiration time for the filter of the connectable liquid source is not expired; and
setting the flow assembly to the filter position in response to determining the filter expiration time for the filter of the external liquid dispenser is not expired, wherein pre-filter reservoir is fluidly coupled to the bottle filter via the channel in the filter position.

11. A bottle assembly for tracking liquid consumption, the bottle assembly comprising:
a body defining a liquid reservoir;
a flow assembly provided within the liquid reservoir; and
a controller operable for:
sensing a dispensing operation of an external liquid dispenser;
determining an identity of the external liquid dispenser based on sensing the dispensing operation of the external liquid dispenser;
adjusting the flow assembly in response to determining the identity of the external liquid dispenser, wherein the flow assembly defines a filter position and a bypass position; and
measuring liquid data of the liquid reservoir following adjusting the flow assembly.

12. The bottle assembly of claim 11, further comprising:
a sensor assembly disposed at a bottom end of the body, wherein sensing the dispensing operation of the external liquid dispenser comprises detecting, via the sensor assembly, an initial volume of liquid has entered the liquid reservoir.

13. The bottle assembly of claim 12, wherein measuring liquid data of the liquid reservoir comprises:
determining, via the sensor assembly, a volume of liquid dispensed into the liquid reservoir by the external liquid dispenser; and
transmitting a signal indicative of the volume of liquid dispensed to an external device registered to the bottle assembly.

14. The bottle assembly of claim 12, wherein the sensor assembly comprises a weight sensor, and wherein measuring liquid data of the liquid reservoir comprises measuring a weight of liquid within the liquid reservoir.

15. The bottle assembly of claim 12, further comprising:
a near field communication module provided therein,
wherein determining the identity of the external liquid dispenser comprises:
searching, via the near field communication module, for a connectable liquid source in response to detecting the initial volume of liquid has entered the liquid reservoir.

16. The bottle assembly of claim 15, further comprising:
a bottle filter for removing unwanted substances from liquid,
wherein the flow assembly comprises a dividing plate that separates the liquid reservoir into a pre-filter reservoir and a main reservoir,
wherein the dividing plate includes a channel defining a flow path therethrough, and
wherein the bottle filter is positioned within the main reservoir to filter water entering the main reservoir.

17. The bottle assembly of claim 16, wherein determining the identity of the external liquid dispenser comprises:
failing to establish a connection with the connectable liquid source;
determining the external liquid dispenser is a non-connectable liquid source following failing to establish the connection with the connectable liquid source; and
setting the flow assembly to the filter position in response to determining the external liquid dispenser is the non-connectable liquid source, wherein pre-filter reservoir is fluidly coupled to the bottle filter via the channel in the filter position.

18. The bottle assembly of claim 16, wherein determining the identity of the external liquid dispenser comprises:
establishing a connection between the bottle assembly and the connectable liquid source via the near field communication module; and
determining a filter expiration time for a filter of the connectable liquid source.

19. The bottle assembly of claim 18, wherein adjusting the flow assembly comprises:
determining the filter expiration time for the filter of the connectable liquid source is expired; and
rotating the dividing plate to the bypass position in response to determining the filter expiration time for the filter of the external liquid dispenser is expired, wherein the pre-filter reservoir is directly fluidly coupled to the main reservoir via the channel in the bypass position.

20. The bottle assembly of claim 18, wherein adjusting the flow assembly comprises:
determining the filter expiration time for the filter of the connectable liquid source is not expired; and
setting the flow assembly to the filter position in response to determining the filter expiration time for the filter of the external liquid dispenser is not expired, wherein pre-filter reservoir is fluidly coupled to the bottle filter via the channel in the filter position.

* * * * *